(12) United States Patent
Shrivastava et al.

(10) Patent No.: US 12,169,680 B2
(45) Date of Patent: Dec. 17, 2024

(54) CONVERTING A PORTABLE DOCUMENT FORMAT TO A LATEX FORMAT

(71) Applicant: Microsoft Technology Licensing, LLC, Redmond, WA (US)

(72) Inventors: Harsh Shrivastava, Redmond, WA (US); Sarah Panda, Bothell, WA (US); Liang Du, Redmond, WA (US); Robin Abraham, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/833,465

(22) Filed: Jun. 6, 2022

(65) Prior Publication Data

US 2023/0394221 A1 Dec. 7, 2023

(51) Int. Cl.
*G06F 40/103* (2020.01)
*G06F 16/11* (2019.01)

(52) U.S. Cl.
CPC .......... *G06F 40/103* (2020.01); *G06F 16/116* (2019.01)

(58) Field of Classification Search
CPC .............................. G06F 40/103; G06F 16/116
See application file for complete search history.

(56) References Cited

U.S. PATENT DOCUMENTS

| | | | | |
|---|---|---|---|---|
| 6,938,034 B1* | 8/2005 | Kraft | .................... | G06F 40/194 |
| 9,928,225 B2* | 3/2018 | Lazarevic | .............. | G06V 30/15 |
| 2002/0118379 A1* | 8/2002 | Chakraborty | ......... | G06F 40/137 |
| | | | | 358/1.9 |
| 2003/0106021 A1* | 6/2003 | Mangrola | ............. | G06F 40/174 |
| | | | | 715/236 |
| 2004/0073708 A1* | 4/2004 | Warnock | ............... | G06F 40/143 |
| | | | | 707/E17.118 |
| 2004/0194009 A1* | 9/2004 | LaComb | ............... | G06F 40/103 |
| | | | | 715/239 |
| 2007/0003147 A1* | 1/2007 | Viola | ................... | G06V 30/274 |
| | | | | 382/229 |

(Continued)

FOREIGN PATENT DOCUMENTS

CN 113723270 A 11/2021
EP 2252045 A1 * 11/2010 ........... H04N 1/6011

(Continued)

OTHER PUBLICATIONS

Wang et al., "PDF2LaTex: A Deep Learning System to Convert Mathematical Documents from PDF to LaTeX," Proceedings of ACM DocEng Symposium, Virtual Event, CA, USA, Sep. 29-Oct. 2, 2020 (Year: 2020).*

(Continued)

*Primary Examiner* — Shahid K Khan
(74) *Attorney, Agent, or Firm* — RAY QUINNEY & NEBEKER; Tiffany Healy

(57) ABSTRACT

The present disclosure relates to methods and systems for converting Portable Document Format (PDF) documents to LaTeX files. The methods and systems use machine learning models to identify and extract PDF portions of a PDF document. The methods and systems create a LaTeX file for the PDF document using the PDF portions extracted by the machine learning models. The methods and systems provide an output with the LaTeX file for the PDF document. The LaTeX file is used to perform different actions on the PDF document.

20 Claims, 6 Drawing Sheets

(56) References Cited

U.S. PATENT DOCUMENTS

| | | | | |
|---|---|---|---|---|
| 2007/0294610 | A1* | 12/2007 | Ching | G06F 16/94 |
| 2007/0300295 | A1* | 12/2007 | Kwok | G06Q 10/10 726/10 |
| 2009/0049062 | A1* | 2/2009 | Chitrapura | G06F 16/986 707/E17.118 |
| 2014/0258371 | A1* | 9/2014 | Hammersley | G06F 8/41 709/203 |
| 2016/0232204 | A1* | 8/2016 | Zholudev | G06F 40/117 |
| 2020/0257755 | A1* | 8/2020 | Staar | G06F 40/169 |
| 2022/0171871 | A1* | 6/2022 | Zhong | G06F 21/6218 |

FOREIGN PATENT DOCUMENTS

| | | | | |
|---|---|---|---|---|
| EP | 2354966 | A2 * | 8/2011 | G06F 17/2211 |
| GB | 2385158 | A  * | 8/2003 | G06F 17/30592 |
| JP | 2004199545 | A  * | 7/2004 | |
| KR | 20070042684 | A  * | 4/2007 | |
| RU | 2421810 | C2 * | 6/2011 | G06F 17/271 |
| WO | WO-0171571 | A1 * | 9/2001 | G06F 16/93 |
| WO | WO-2004070617 | A1 * | 8/2004 | G06F 3/1206 |
| WO | WO-2007005937 | A2 * | 1/2007 | G06F 17/271 |
| WO | 2022066666 | A1 | 3/2022 | |

OTHER PUBLICATIONS

Larsson et al., "preview-latex," Feb. 2, 2022 (Year: 2022).*

Wang et al., "PDF2LaTex: A Deep Learning System to Convert Mathematical Documents from PDF to LaTex," Proceedings of ACM DocEng Symposium, Virtual Event, CA, USA (Year: 2020).*

Glassman, Zachary, "Math Mode: Overview," available at https://web.archive.org/web/20220303082812/https://www1.cmc.edu/pages/faculty/aaksoy/latex/latexthree.html# (Year: 2022).*

Davis et al. end-to-end document recognition and understanding with dessurt (Year: 2022).*

Shilman et al., Learning non-generative grammatical models for document analysis (Year: 2005).*

Xu et al., layoutLM: Pre-training of text and layout for document image understanding (Year: 2020).*

Yang et al., Learning to extract semantic structure from documents using multimodal fully CNN (Year: 2017).*

"PDF 2 LaTeX", Retrieved from: https://converter.app/pdf-to-latex/, Retrieved Date: Apr. 11, 2022, 4 Pages.

Cunningham, Kaitlin, "Convert Whole PDFs to LaTeX, DOCX, Markdown; Updated Pricing", Retrieved from: https://web.archive.org/web/20210616022338/https://mathpix.com/blog/pdf-processing-new-pricing, Jun. 16, 2021, 5 Pages.

Hansen, et al., "Data-Driven Recognition and Extraction of PDF Document Elements", In Journal of Technologies, vol. 7, Issue 3, Sep. 11, 2019, 19 Pages.

Ramakrishnan, et al., "Layout-Aware Text Extraction from Full-Text PDF of Scientific Articles", In Journal of Source Code for Biology and Medicine, vol. 7, Issue 1, May 28, 2012, 10 Pages.

Wang, et al., "PDF2LaTeX: A Deep Learning System to Convert Mathematical Documents from PDF to LaTeX", In Proceedings of the ACM Symposium on Document Engineering, Sep. 29, 2020, 10 Pages.

"International Search Report and Written Opinion Issued in PCT Application No. PCT/US23/021610", Mailed Date: Sep. 5, 2023, 11 Pages.

Shah, et al., "A Math Formula Extraction and Evaluation Framework for PDF Documents", In 16th International Conference on Document Analysis and Recognition, Sep. 5, 2021, pp. 19-34.

Sojka, et al., "Document Engineering for a Digital Library", In Proceedings of the 10th ACM Symposium on Document Engineering, Sep. 21, 2010, pp. 3-12.

* cited by examiner

200

1 All info

We introduce a

1. The precision matrix represent the conditional independence among the features. Multiplying $x_i^T \Sigma R^{d \times d}$ with the precision matrix $\Theta$ Consider a single data point $x \in R^{D \times 1}$. Now the operation of multiplying the precision matrix $\Theta R^{D \times D}$ is mathematically expressed as $$x^c = \Theta x$$ (1)
$$= [\Theta_{11}x_1 + \Theta_{12}x_2 + \ldots + \Theta_{1D}x_D, \ldots, \Theta_{D1}x_1 + \ldots + \Theta_{DD}x_D]^T$$ (2)

$$x_i^c = \Theta_{i1}x_1 + \Theta_{i2}x_2 + \ldots + \Theta_{iD}x_D$$ (3)
$$\Theta_{ij} = \text{inverse of covariance}$$ (4)

Mathematically calculate the $\Theta_{ij}$ in terms of the covariance matrix. The covariance matrix is $1/M (X - \mu X)^T (X - \mu X)$ or in terms of the expectation.

The $x_i$ captures the variance of opinion among the features. The precision matrix, in a conditionally independent fashion, captures the variance or dependence among the different features. So, in case the variance between 2 features is highly correlated, that will get reflected in the transformed data.

12

```
124  \begin{Introduction}
125  \section{All Info}
126  We introduce a
127
128  \begin{enumerate}
129    \item The precision matrix represent the conditional independence among the
130    features. Multiplying $x\in[R]^[m times d]$ with the precision matrix $\theta$
131  \end{enumerate}
132
133  Consider a single data point $x\in[R]^[D times 1]$. Now the operation of
134  multiplying the precision matrix $\theta\in[R]^[DxD]$ is mathematically expressed as
135  \begin{align}
136    x^c&=\theta \times x\\
137    &= [\theta_{11}x_1+\theta_{12}x_2+\cdots+\theta_{1D}x_D,\cdots,\theta_{d1}
138    + \theta_{D@}x_2+\cdots+\theta_{DD}x_D]^T
139  \end{align}
140  \begin{align}
141    x^c_i&=\theta_{i1}x_1+\theta_{i2}x_2+\cdots+\theta_{1D}x_D\\
142    \theta_{ij}&=\text{inverse of covariance}
143  \end{align}
144
145  Mathematically calculate the $\theta_{ij}$ in terms of the covariance matrix. The
146  covariance matrix is $\frac{1}{m}(x-\mu_X)^T(x-\mu_x)$
147  \end{Introduction}
```

```
124  \begin{introduction}
125  \section{introduction}
126  \end{introduction}
127  We introduce a
128  \begin{enumerate}
129      \item The precision matrix represent the conditional independence among the
130      features. Multiplying $x\in\[R]^{m \times d}$ with the precision matrix $\theta$
131  \end{enumerate}
132  Consider a single data point $x\in\[R]^{Dx0}$ is mathematically expressed as
133  multiplying the precision matrix $\theta\[R]^{Dx0}$ is mathematically expressed as
134  \begin{align}
135      x^c&=\theta \times x\\
136      &= [\theta_{11}x_1+\theta_{12}x_2+\cdots+\theta_{1D}x_D\cdots,\theta_{d1}
137          + \theta_{D0}x_2+\cdots+\theta_{D0}x_D^T
138  \end{align}
139  \begin{align}
140      x^c_{18}=\theta_{11}x_1+\theta_{12}x_2+\cdots+\theta_{1D}x_D\\
141      \theta_{ij}&=\text{inverse of covariance}
142  \end{align}
143  Mathematically calculate the $\theta_{ij}$ in terms of the covariance matrix. The
144      covariance matrix is $\frac{1}{m}(x-\mu_x)^T(x-\mu_x)$
145  \end{introduction}
```

1 Introduction

We introduce a

1. The precision matrix represent the conditional independence among the features. Multiplying $X \in R^{M \times D}$ with the precision matrix $\Theta$ Consider a single data point $x \in R^{D \times 1}$. Now the operation of multiplying the precision matrix $\Theta R^{D \times D}$ is mathematically expressed as $$x^c = \Theta \times x \qquad (1)$$
$$= [\Theta_{1,1}x_1 + \Theta_{1,2}x_2 + \ldots + \Theta_{1,D}x_D, \ldots, \Theta_{D,1}x_1 + \Theta_{D,2}x_2 + \ldots + \Theta_{D,D}x_D]^T \qquad (2)$$

$$x^c_i = \Theta_{i,1}x_1 + \Theta_{i,2}x_2 + \ldots + \Theta_{i,D}x_D \qquad (3)$$
$$\Theta_{ij} = \text{inverse of covariance} \qquad (4)$$

Mathematically calculate the $\Theta_{ij}$ in terms of the covariance matrix. The covariance matrix is $1/M (X - \mu_X)^T (X - \mu_X)$ or in terms of the expectation.
The $x_c$ captures the variance of opinion among the features. The precision matrix, in a conditionally independent fashion, captures the variance or dependence among the different features. So, in case the variance between 2 features is highly correlated, that will get reflected in the transformed data.

FIG. 2B

CONVERTING A PORTABLE DOCUMENT FORMAT TO A LATEX FORMAT

BACKGROUND

Portable Document Formats (PDF) are one of the most widely used document formats to share information over the internet. Current solutions use Optical Character Recognition (OCR) to convert PDF documents to a corresponding LaTeX format. The LaTeX code generated by current solutions is unable to identify document entities from the PDF documents in human readable form. In addition, the LaTeX code generated by the current solutions is difficult to understand.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations relate to a method. The method includes receiving a Portable Document Format (PDF) document. The method includes using a plurality of machine learning models to identify and extract a plurality of PDF portions of the PDF document. The method includes creating a LaTeX file for the PDF document by formatting the plurality of PDF portions in the LaTeX file and identifying a start of each PDF portion and an end of each PDF portion. The method includes providing an output with the LaTeX file for the PDF document.

Some implementations relate to a device. The device includes one or more processors; memory in electronic communication with the one or more processors; and instructions stored in the memory, the instructions executable by the one or more processors to: receive a Portable Document Format (PDF) document; use a plurality of machine learning models to identify and extract a plurality of PDF portions of the PDF document; create a LaTeX file for the PDF document by formatting the plurality of PDF portions in the LaTeX file and identifying a start of each PDF portion and an end of each PDF portion; and provide an output with the LaTeX file for the PDF document.

Some implementations relate to a method. The method includes receiving a LaTeX file from a Portable Document Format (PDF) document, wherein the LaTeX file identifies a start of each PDF portion of the PDF document and an end of each PDF portion of the PDF document. The method includes performing an action on the LaTeX file. The method includes generating a desired PDF document using an obtained LaTeX file in response to the action.

Some implementations relate to a device. The device includes one or more processors; memory in electronic communication with the one or more processors; and instructions stored in the memory, the instructions executable by the one or more processors to: receive a LaTeX file from a Portable Document Format (PDF) document, wherein the LaTeX file identifies a start of each PDF portion of the PDF document and an end of each PDF portion of the PDF document; perform an action on the LaTeX file; and generate a desired PDF document using an obtained LaTeX file in response to the action.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 2A illustrates an example graphical user interface of a LaTeX file for a PDF document in accordance with implementations of the present disclosure.

FIG. 2B illustrates an example graphical user interface of a modified LaTeX file and a modified PDF document in accordance with implementations of the present disclosure.

DETAILED DESCRIPTION

Figure 1:
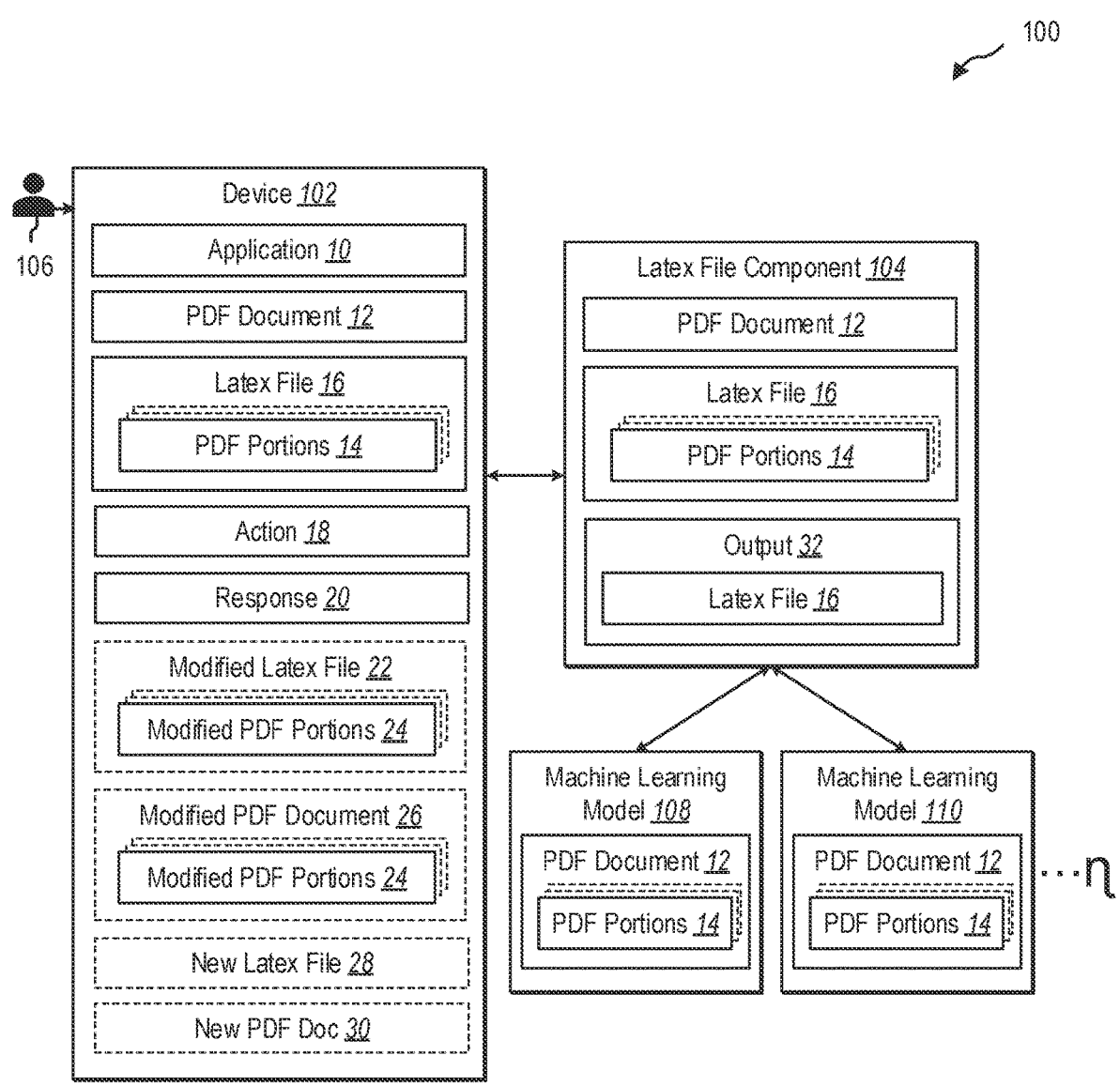
FIG. 1 illustrates an example environment for converting PDF documents to a LaTeX file in accordance with implementations of the present disclosure.

This disclosure generally relates to converting PDF documents to LaTeX files. Current solutions for converting PDF documents to a LaTeX format use Optical Character Recognition (OCR) to convert PDF documents to a corresponding LaTeX format. The current solutions go through all the points in the X-Y coordinates of the PDF document and provide an output with the LaTeX code for the PDF document that includes the coordinate information along with the character recognized. The LaTeX code generated by the current solutions is unable to identify document entities from the PDF documents in human readable form. In addition, the LaTeX code generated by the current solutions is difficult to understand since each character is provided with a coordinate in the character.

The present disclosure provides methods and systems that convert PDF documents to a user-friendly LaTeX file on-the-fly. The LaTeX files may be generated in real time without requiring pre-computation of the LaTeX files. The methods and systems use a conglomeration of multiple machine learning and deep learning models that perform table extraction, image extraction, caption recognition, and/or leverage document parsers to recognize different information from the PDF documents (the section headings, subsection headings, titles, and/or other meta information across the PDF documents). The methods and systems use the information extracted by the machine learning models from the PDF documents to generate the corresponding LaTeX file for the PDF document. The methods and systems provide an efficient framework for converting the PDF documents to corresponding LaTeX code by using the information obtained from the PDF documents to convert the PDF documents to corresponding LaTeX code on-the-fly.

The methods and system provide an output with the LaTeX format code in a LaTeX file for the PDF documents. The users may use the LaTeX code to perform different actions or tasks on the obtained text from the LaTeX format. One example action or task includes document comparison and/or plagiarism detection using tools on the obtained text from the LaTeX format. For example, to compare 2 PDF documents, the methods and systems convert the PDF documents to a LaTeX format first and apply a comparison processing over the text obtained from the LaTeX format. Other example actions include extracting desired content from the PDF documents using the obtained text from the LaTeX format, modifying and/or editing existing content of the PDF documents using the obtained text from the LaTeX format, and/or merging content from multiple PDF documents using the obtained text from the LaTeX format. As such, the LaTeX format may enable different actions or tasks to be performed on the PDF documents easier.

The methods and systems also enable updating and editing the PDF documents. The methods and systems enable the users to create their own version of PDF documents with any desired modifications and/or changes to the PDF documents. The user may easily make changes to the LaTeX code provided in the output by the methods and systems. In some implementations, the user may use a LaTeX-to-PDF convertor to convert the edited LaTeX code into a PDF document. The methods and systems may provide additional formatting options to the users for the PDF documents.

The methods and systems identify the distinct parts of the PDF documents (e.g., images, titles, paragraphs, tables, captions, sections, and/or subsections) and synthesize the information identified efficiently to create the corresponding user-friendly LaTeX code for the PDF documents. The methods and systems provide an output with the LaTeX code in an easily to understand manner by the user by using a formatting of the LaTeX code that is clear and easy to understand by the user. The LaTeX code output is also readily portable to different applications and/or uses.

One technical advantage of the methods and systems of the present disclosure is smartly parsing the PDF documents efficiently to gain more understanding of the PDF documents and extracting meaningful information from the PDF documents for use in downstream tasks. The methods and systems use specially trained machine learning and deep learning models to accurately identify the different portions of the PDF documents. The methods and systems use specialized machine learning and deep learning models trained to recognize images, do chart understanding, extract various types of tables, and/or recognize math symbols and equations. As such, the machine learning and deep learning models used by the methods and systems of the present disclosure are better at identifying and extracting the different portions of the PDF documents as compared to current solutions.

Another technical advantage of the methods and systems of the present disclosure is distinguishing the different portions identified of the PDF documents in the LaTeX files, and thus, providing the LaTeX code in an understandable format. Another technical advantage of the methods and systems of the present disclosure is updating and/or editing PDF documents. The users may easily make changes to the LaTeX code obtained by the methods and systems to edit the existing content of PDF documents. The methods and systems provide additional formatting options to the users to enable the users to modify or edit PDF documents in a user friendly manner. Thus, the users may create their own version of the PDF documents with any desired modifications or changes.

Referring now to FIG. 1, illustrated is an example environment 100 for converting PDF documents 12 to a LaTeX file 16. The environment 100 may include one or more users 106 interacting with one or more devices 102. The devices 102 may include applications 10 that aid the users 106 in viewing PDF documents 12 and/or editing PDF documents 12. The users 106 may provide an identification of one or more PDF documents 12. For example, the users 106 may upload or otherwise provide the PDF documents 12 to the device 102. Another example includes the device 102 obtaining the PDF documents 12 from a datastore of PDF documents or other remote locations (e.g., other devices or systems).

The device 102 is in communication with a LaTeX file component 104 that receives the PDF document 12 and generates a LaTeX file 16 for the PDF document 12. The LaTeX file component 104 provides an output 32 with the LaTeX file 16 to the device 102 for presentation to the user 106. The LaTeX file component 104 generates the LaTeX file 16 for the PDF document 12 on-the-fly. The LaTeX file component 104 performs the conversion of the PDF document 12 to the LaTeX file 16 in real-time by directly operating on the data source (e.g., the PDF document 12) and generating the LaTeX file 16 in real time without requiring pre-computation of the LaTeX file 16. In some implementations, the device 102 provides the PDF document 12 to the LaTeX file component 104 in response to the user 106 selecting an icon to request the LaTeX file 16 or providing another indication that the LaTeX file 16 is requested. In some implementations, the device 102 provides the PDF document 12 to the LaTeX file component 104 automatically in response to the application 10 being accessed by the user 106.

The LaTeX file component 104 communicates with a plurality of machine learning models 108, 110 up to n (where n, is a positive integer) in generating the LaTeX file 16. The LaTeX file component 104 provides the PDF document 12 to the machine learning models 108, 110 as input and the machine learning models 108, 110 analyze the PDF document 12. Examples of analysis performed by the machine learning models 108, 110 on the PDF document 12 include performing table extraction, image extraction, and/or caption recognition. In addition, the machine learning models 108, 110 may leverage document parsers to recognize the section headings, subsection headings, titles, and/or other metainformation across the PDF document 12 in the analysis of the PDF document 12. In some implementations, the machine learning models 108, 110 are deep learning machine models.

The machine learning models 108, 110 identify and extract the PDF portions 14 of the PDF document 12 based on the analysis of the PDF document 12. For example, the PDF portions 14 include text, a title, paragraphs, sections, subsections, flow charts, tables, images with captions, tables with captions, diagrams, math equations, symbols, authors, references, and/or any other metainformation from the PDF document 12.

In some implementations, different machine learning models 108, 110 are used for extracting separate PDF portions 14 of the PDF document 12. The machine learning models 108, 110 are selected based on a specialization or training of the machine learning models 108, 110. A combination of different machine learning models 108, 110 may be used to identify the different PDF portions 14 of the PDF document 12. For example, the machine learning model 108 is selected to extract equations from the PDF document 12 and the machine learning model 110 is selected to extract diagrams and flow charts from the PDF document 12. Another example includes the machine learning model 108 is selected to extract paragraphs and text from the PDF document 12 and the machine learning model 110 is selected to extract tables from the PDF document 12. Another example includes the machine learning model 108 is selected to extract images from the PDF document 12 and the machine learning model 110 is selected to extract metainformation from the PDF document 12. Any combination of separate machine learning models 108, 110 up to n may be used to identify and extract the different PDF portions 14 of the PDF documents 12. As such, the LaTeX file component 104 uses a conglomeration of multiple machine learning models 108, 110 to extract the different PDF portions 14 of the PDF documents 12.

The LaTeX file component 104 processes the PDF portions 14 of the PDF document 12 and generates the LaTeX file 16. The LaTeX file component 104 determines an order or arrangement of the PDF portions 14 for placing the PDF portions 14 in the LaTeX file 16. The LaTeX file component 104 may control the placement of the PDF portions 14 as per each PDF portion's 14 requirements since the PDF portions 14 (e.g., images, sections, tables, subsections, references, etc.) are identified and parsed separately. In some implementations, the order of the PDF portions 14 corresponds to a presentation order of the plurality of PDF portions 14 in the PDF document 12, and the PDF portions 14 are arranged in a similar manner as presented in the PDF document 12.

The LaTeX file 16 component 104 creates the LaTeX file 16 by formatting the PDF portions 14 and arranging the PDF portions 14 in the LaTeX file 16 in the determined order. The LaTeX file 16 identifies a start of each PDF portion 14 and an end of each PDF portion 14. By identify the start and end of each PDF portion 14, the LaTeX file distinguishes between each PDF portion 14 so that the user 106 may easily identify the different PDF portions 14 in the LaTeX file 16. For example, the LaTeX file 16 has a clear distinction (e.g., a start and end of each PDF portion 14) between the paragraph, title, sections, images, tables, flow charts, diagrams, equations, and/or paragraphs identified and extracted from the PDF document 12. As such, the LaTeX file component 104 efficiently converts the PDF document 12 to the corresponding LaTeX file 16 on-the-fly and provides an output 32 of the LaTeX file 16 in a user friendly format that is understandable by the user 106.

The device 102 may receive the output 32 with the LaTeX file 16 from the LaTeX file component 104 and present the LaTeX file 16 to the user 106. The LaTeX file 16 may distinguish between the separate PDF portions 14 so that the user 106 may easily identify the PDF portions 14 in the LaTeX file 16. For example, a user interface on the device 102 may present the LaTeX file 16 to the user 106. In some implementations, the LaTeX file 16 is present adjacent to or nearby the PDF document 12 so that the user 106 may view both the PDF document 12 and the LaTeX file 16 together.

The user 106 may perform one or more actions 18 for the PDF document 12 using the LaTeX file 16. The device 102 may receive the one or more actions 18 from the user 106 for the PDF document 12 and perform the one or more actions 18 on the LaTeX file 16 of the PDF document 12. One example action 18 includes modifying and/or editing existing content of the PDF document 12. The user 106 may provide one or more modifications to the LaTeX file 16 that provides a change to the PDF document 12. The change may include an addition of information to the PDF document 12 or the removal of information from the PDF document 12. The change may also include edits or updates to the information in the PDF document 12.

A modified LaTeX file 22 is generated with one or more modified PDF portions 24 based on the modifications received from the user 106. The user interface may present a response 20 to the action 18. For example, the user interface may present a modified PDF document 26 with the modified PDF portions 24 with the change(s) to the PDF document 12. The modified PDF document 26 is generated using the modified LaTeX file 22. In some implementations, the device 102 uses a LaTeX-to-PDF convertor to convert the modified LaTeX file 22 to the modified PDF document 26.

The device 102 may convert the modified LaTeX file 22 to the modified PDF document 26 on-the-fly in response to the user 106 selecting an icon or requesting a presentation of the modified PDF document 26. The modified PDF document 26 is generated using the modified LaTeX file 22 in real time without requiring pre-computation of the modified PDF document 26 or the modified LaTeX files 22. As such, the user 106 may use the LaTeX file 16 to easily identify the different sections of the PDF documents 12 and make any desired edits and/or changes to the sections of the PDF document 12. In addition, the user 106 may easily view the corresponding changes in the modified PDF document 26.

Another example of the action 18 includes merging content from a plurality of PDF documents 12 together using a LaTeX representation of the PDF documents 12. In some implementations, the user 106 may merge separate PDF documents 12 together to create a new PDF document 30. The user 106 may identify the plurality of PDF documents 12 and may receive a plurality of LaTeX files 16 from the LaTeX file component 104 for the plurality of PDF documents 12. In some implementations, the user 106 may create a new LaTeX file 28 with the selected portions from the different PDF documents 12. For example, the user 106 may copy the respective sections from the different LaTeX files 16 of the PDF documents 12 to add to the new LaTeX file 28.

A new PDF document 30 may be presented using the new LaTeX file 28. The new PDF document 30 is a combination of the plurality of PDF documents 12. For example, the device 102 may convert the new LaTeX file 28 to the new PDF document 30 on-the-fly in response to the user 106 selecting an icon or requesting a presentation of the new PDF document 30. The user 106 may converge information from a plurality of PDF documents 12 to a single new PDF document 30. As such, the user 106 may perform customized merging of a plurality of PDF documents 12 to create a new PDF document 30 easily by copying the selected portions of the LaTeX files 16 to add to the new LaTeX file 28.

In some implementations, the user 106 may add information from other PDF documents to the PDF document 12 the user 106 is editing. The user may create the modified LaTeX file 22 for the PDF document 12 with information copied from the LaTeX file 16 of the other PDF document. For example, the user 106 may add a table from the other PDF document to the PDF document 12 that the user 106 is editing, the user 106 may easily identify the table in the LaTeX file 16 of the other document using the identification of the start of the table and the end of the table in the LaTeX file 16 and copy the table from the LaTeX file 16 to the modified LaTeX file 22. The modified LaTeX file 22 is used to generate a modified PDF document 26 with the selected table added to the modified PDF document 26. As such, the user 106 may identify any portions of a plurality of PDF documents 12 to merge together easily by copying the corresponding portion of the LaTeX file 16 and adding the portion to a modified LaTeX file 22 to generate a modified PDF document 26.

Another example of the action 18 includes comparing a plurality of PDF documents 12 based on a LaTeX representation of the plurality of PDF documents 12. The user 106 may identify a plurality of PDF documents 12 and may receive a plurality of LaTeX files 16 from the LaTeX file component 104 for the plurality of PDF documents 12. The user 106 may provide the plurality of LaTeX files 16 to a comparison function, which performs a comparison of the plurality LaTeX files 16 to determine whether portions of the plurality of LaTeX files 16 are similar to each other or are the same as each other. For example, the portions of the plurality of LaTeX files 16 are similar to each other overlapping content occurs between the portions. The user interface may present the response 20 to the comparison with an output with any portions of the plurality of LaTeX files 16 identified as the same or similar to each other. As such, the plurality of LaTeX files 16 may be used to easily compare the plurality of PDF documents 12 to determine any similarities between the PDF documents 12. The user 106 may use the response to identify plagiarism and/or make plagiarism detection easier.

Another example of the action 18 includes a customization of the PDF document 12. The user 106 may provide one or more customizations to the PDF document 12 by generating a modified LaTeX file 22 with the customization. For example, a customization includes changing a format of the PDF document 12. Another example of a customization includes changing to a multiple column format of the PDF document 12. Another example of a customization includes modifying the document style (e.g., single column, double column, etc.) of the PDF document 12. The modified LaTeX file 22 is used to generate a modified PDF document 26 with the customization. The user interface may present a response 20 to the action 18 with a modified PDF document 26 with the customizations using the modified LaTeX file 22. As such, the user 106 may use the LaTeX files 16 to easily perform a variety of actions 18 on the PDF documents 12.

Another example of the action 18 includes extracting desired content from the PDF document 12. The user 106 may provide an identification or selection of content from the PDF document 12 to extract in the LaTeX file 16. The device 102 may extract the content from the LaTeX file 16. For example, the user 106 may copy the content from the LaTeX file 16 or otherwise remove the content from the LaTeX file 16. In some implementations, the device 102 generates a new LaTeX file 28 with the extracted content and the user interface may present a response 20 to the action 18 with the new LaTeX file 28 with the extracted content. In some implementations, the device 102 may provide the extracted content to another document or other applications 10.

In some implementations, one or more computing devices (e.g., servers and/or devices) are used to perform the processing of the environment 100. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the application 10, the LaTeX file component 104, and/or the machine learning models 108, 110 are implemented wholly on the same computing device. Another example includes one or more subcomponents of the LaTeX file component 104 and/or the machine learning models 108, 110 are implemented across multiple computing devices. Moreover, in some implementations, one or more subcomponent of the LaTeX file component 104 and/or the machine learning models 108, 110 may be implemented are processed on different server devices of the same or different cloud computing networks.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular implementation. In some implementations, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

The environment 100 converts PDF documents 12 to a user-friendly LaTeX file 16 on-the-fly and outputs the LaTeX file in an understandable format that is clear and distinguishes between the different PDF portions 14 of the PDF documents 12. The users 106 may easily perform various actions 18 on the LaTeX files 16 of the PDF documents 12.

Referring now to FIG. 2A, illustrated is an example graphical user interface 200 with an output 32 (FIG. 1) of a LaTeX file 16 for a PDF document 12. For example, the user device 102 presents the user interface 200 to the user 106 (FIG. 1) with the LaTeX file 16 generated by the LaTeX file component 104 (FIG. 1) for the PDF document 12. The LaTeX file 16 is presented next to the PDF document 12 so that the user 106 may view both the PDF document 12 and the corresponding LaTeX file 16 together.

The LaTeX file 16 includes an identification of a start 204 "begin{Introduction}" of the introduction PDF portion 14 and an end 206 "end{Introduction}" of the introduction PDF portion 14. As such, the LaTeX file 16 clearly distinguishes between the different PDF portions 14 by identifying the start 204 and the end 206 of the different PDF portions 14.

In some implementations, as the user 106 moves to different a different PDF portion 14 of the PDF document 12 (e.g., by scrolling down or up, or selecting a different page), the corresponding LaTeX file 16 for the PDF portion 14 is displayed in the LaTeX file 16. For example, if the user 106 is viewing the Abstract portion of the PDF document 12, the Abstract portion of the LaTeX file 16 is displayed and if the user 106 moves to a table in the PDF document 12, the table portion of the LaTeX file 16 is displayed. As such, the user 106 may easily identify in the LaTeX file 16, the different PDF portions 14 of the PDF document 12.

The user 106 may select a portion 202 to change in the LaTeX file 16. For example, the user may select the section header "All Info" for the introduction PDF portion 14 to change to "Introduction." A modified LaTeX file 22 is generated for the change in the section header, as illustrated in FIG. 2B.

Referring now to FIG. 2B, the modified LaTeX file 22 is generated with the modified PDF portion 24 for the change of "Introduction" in the section header for the section header of the introduction PDF portion 14. The user interface 200 presents a modified PDF document 26 with the modified PDF portion 24 using the modified LaTeX file 22. The modified PDF document 26 replaces "All Info" (FIG. 2A) with the new section header "Introduction" based on the modifications provided to the modified LaTeX file 22.

In some implementations, the user interface 200 automatically presents the modified PDF document 26 in response to modifications occurring to the modified LaTeX file 22. In some implementations, the user 106 selects and icon or provides a request for the modified PDF document 26 to be presented. As such, the user 106 may easily make edits to the PDF documents by modifying the LaTeX files 16 to generate modified LaTeX files 22 and view the modified PDF document 26 on-the-fly in real time without requiring pre-computation of the modified PDF document 26 or the modified LaTeX files 22.

Figure 3:
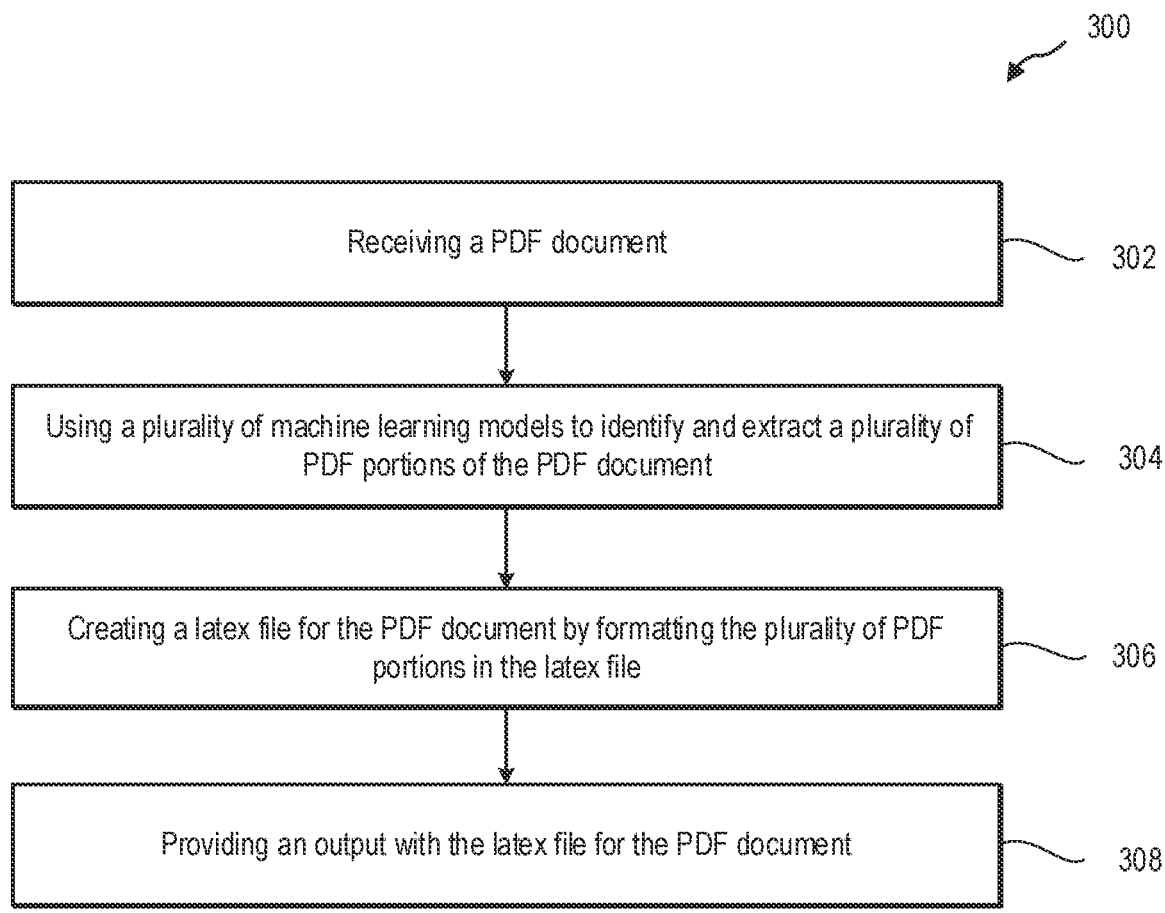
FIG. 3 illustrates an example method for converting a PDF document to a LaTeX file in accordance with implementations of the present disclosure.

Referring now to FIG. 3, illustrated is an example method 300 for converting a PDF document to a LaTeX file. The actions of method 300 are discussed below with reference to the architecture of FIG. 1.

At 302, the method 300 includes receiving a PDF document. The LaTeX file component 104 receives the PDF document 12. In some implementations, the LaTeX file component 104 receives the PDF document 12 in response to the user 106 selecting an icon to request the LaTeX file 16 for the PDF document 12 or providing another indication that the LaTeX file 16 is requested for the PDF document 12. In some implementations, the device 102 provides the PDF document 12 to the LaTeX file component 104 automatically in response to an application 10 being accessed by the user 106, for example, using the device 102 to access the application for editing PDF documents 12.

At 304, the method 300 includes using a plurality of machine learning models to identify and extract a plurality of PDF portions of the PDF document. The machine learning models 108, 110 identify and extract the PDF portions 14 of the PDF document 12 based on the analysis of the PDF document 12. Examples of analysis performed by the machine learning models 108, 110 on the PDF document 12 include performing table extraction, image extraction, and/or caption recognition. In addition, the machine learning models 108, 110 may leverage document parsers to recognize the section headings, subsection headings, titles, and/or other metainformation across the PDF document 12 in the analysis of the PDF document 12. In some implementations, the machine learning models 108, 110 are deep learning machine models.

The PDF portions 14 include one or more of text, a title, paragraphs, sections, subsections, flow charts, images, tables, images with captions, tables with captions, diagrams, math equations, symbols, authors, references, and/or any other metainformation from the PDF document 12. In some implementations, different machine learning models (e.g., the machine learning models 108, 110) are used to identify separate PDF portions 14. In some implementations, the machine learning models 108, 110 are specially trained for identifying and extracting a specific PDF portion 14. In some implementations, a combination of different machine learning models 108, 110 are used to identify the separate PDF portions 14.

At 306, the method 300 includes creating a LaTeX file for the PDF document by formatting the plurality of PDF portions in the LaTeX file. The LaTeX file component 104 creates the LaTeX file 16 for the PDF documents 12 by formatting the PDF portions 14 in the LaTeX file 16. The LaTeX file 16 identifies a start of each PDF portion 14 and an end of each PDF portion 14. As such, the LaTeX file 16 distinguishes between each PDF portion 14. In some implementations, the PDF portions 14 are arranged in an order in the LaTeX file 16 that corresponds to a presentation order of the PDF portions 14 in the PDF document 12. The LaTeX file 16 is generated for the PDF document 12 on-the-fly in real time without requiring pre-computation of the LaTeX file 16.

At 308, the method 300 includes providing an output with the LaTeX file for the PDF document. The LaTeX file component 104 provides an output 32 with the LaTeX file 16 for the PDF document 12 to present to the user 106. The output 32 of the LaTeX file 16 is a user friendly format that is easily understandable by the user 106. The LaTeX file 16 may distinguish between the separate PDF portions 14 so that the user 106 may easily identify the PDF portions 14 in the LaTeX file 16. For example, a user interface on the device 102 may present the LaTeX file 16 to the user 106. In some implementations, the LaTeX file 16 is presented next to the PDF document 12 so that the user 106 may view both the PDF document 12 and the LaTeX file 16 together.

In some implementations, the method 300 is used to create a plurality of LaTeX files 16 for a plurality of PDF documents 12. For example, if the user 106 is viewing multiple PDF documents 12, the method 300 may generate the corresponding LaTeX files 16 for each PDF document 12 the user 106 is viewing.

The method 300 is used to convert the PDF documents 12 to a user-friendly LaTeX file 16 on-the-fly. The LaTeX file is outputted in an understandable format that is clear and distinguishes between the different PDF portions 14 of the PDF documents 12.

Figure 4:
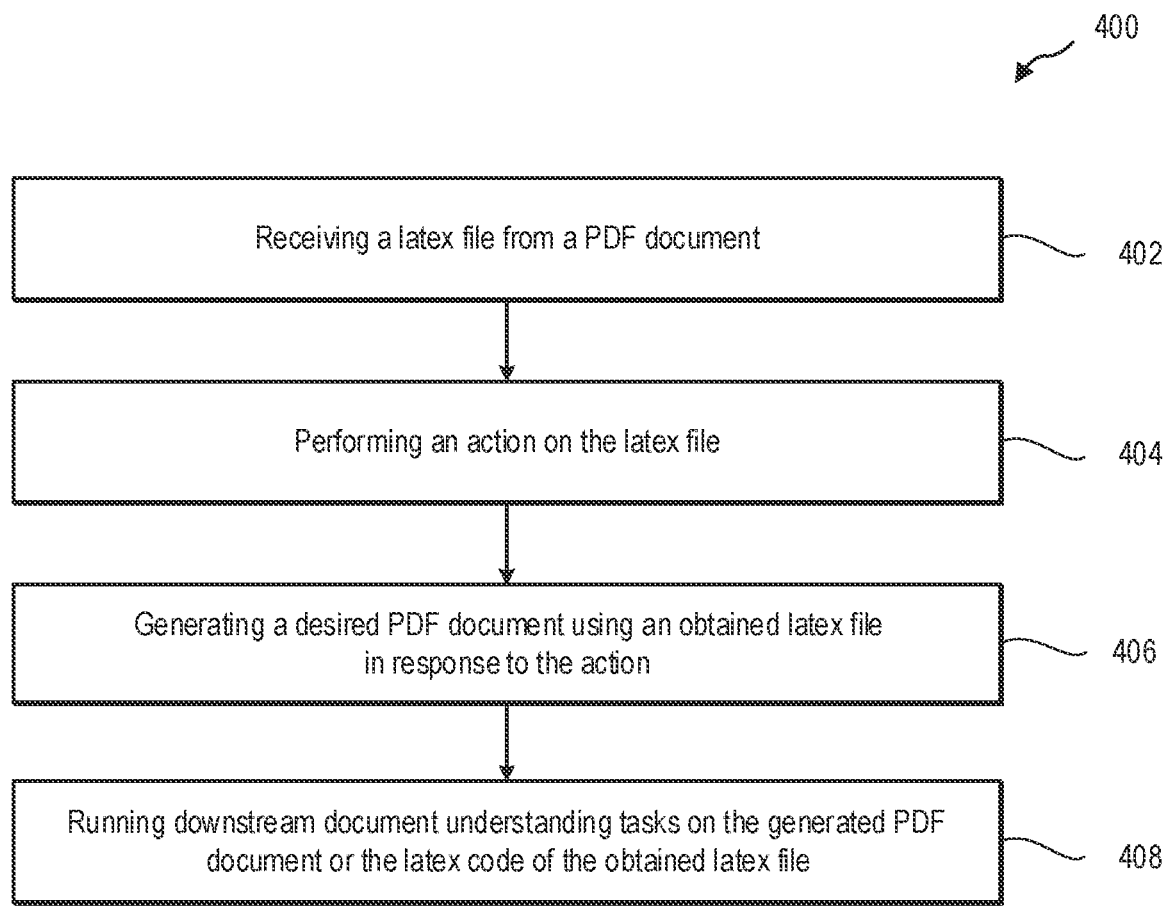
FIG. 4 illustrates an example method for using a LaTeX file to perform an action on a PDF document in accordance with implementations of the present disclosure.

Referring now to FIG. 4, illustrated is a method 400 for using a LaTeX file to perform an action on a PDF document. The actions of method 400 are discussed below with reference to the architecture of FIG. 1.

At 402, the method 400 includes receiving a LaTeX file from a PDF document. The device 102 may receive the output 32 with the LaTeX file 16 from the LaTeX file component 104 and present the LaTeX file 16 to the user 106. The LaTeX file 16 may distinguish between the separate PDF portions 14 so that the user 106 may easily identify the PDF portions 14 in the LaTeX file 16. The LaTeX file 16 identifies a start of each PDF portion 14 of the PDF document 12 and an end of each PDF portion 14 of the PDF document 12. For example, a user interface on the device 102 may present the LaTeX file 16 to the user 106. In some implementations, the LaTeX file 16 is presented adjacent to or nearby the PDF document 12 so that the user 106 may view both the PDF document 12 and the LaTeX file 16 together.

In some implementations, the device 102 receives the LaTeX file 16 from the LaTeX file component 104 in response to the user 106 selecting an icon to request the LaTeX file 16 or providing another indication that the LaTeX file 16 is requested. In some implementations, the device 102 receives the LaTeX file component 104 automatically from the LaTeX file component 104 in response to an application 10 being accessed by the user 106.

At 404, the method 400 includes performing an action on the LaTeX file, and at 406, the method 400 includes generating a desired PDF document using an obtained LaTeX file in response to the action. The device 102 may receive one or more actions 18 from the user 106 for the LaTeX file 16 and may perform the one or more actions 18 on the LaTeX file 16. The device 102 may also generate a desired PDF document (e.g., the modified PDF document 26, the new PDF document 30) using the resultant LaTeX file obtained (e.g., the modified LaTeX file 22, the new LaTeX file 28) in response to the action 18. In some implementations, the desired PDF document (e.g., the modified PDF document 26, the new PDF document 30) is generated on-the-fly in response to receiving the obtained LaTeX file (e.g., the modified LaTeX file 22, the new LaTeX file 28).

In some implementations, the action 18 is extracting desired content from the PDF document 12. The device 102 may receive an identification or selection of content in the LaTeX file 16 (e.g., the desired content from the PDF document 12) and may extract the content from the LaTeX file 16. For example, the device 102 copies, or otherwise removes, the identified content from the LaTeX file. In some implementations, the device 102 generates a new LaTeX file 28 with the extracted content and may generate a new PDF document 30 using the new LaTeX file 28. In some implementations, the device 102 may provide the extracted content to another document or other application 10 for use.

In some implementations, the action 18 is modifying and/or editing existing content in the PDF document 12. The device 102 may receive one or more modifications to the LaTeX file 16 that provides at least one change to existing content in the PDF document 12. The device 102 may generate a modified LaTeX file 22 with the at least one change (e.g., a modified PDF portion 24). The device 102 may use the modified LaTeX file 22 (e.g., the obtained LaTeX file) to output the modified PDF document 26 (e.g., a desired PDF document) with the at least one change (e.g., a modified PDF portion 24). In some implementations, the device 102 uses a LaTeX-to-PDF convertor to convert the modified LaTeX file 22 to the modified PDF document 26. In some implementations, the modified PDF document 26 is generated on-the-fly in response to receiving the modified LaTeX file 22. In some implementations, the modified PDF document 26 is generated on-the-fly in response to the user 106 providing a request for the presentation of the modified PDF document 26. As such, the user 106 may use the LaTeX file 16 to easily identify the different sections of the PDF documents 12 and make any desired edits and/or changes to the existing content of the PDF document 12 by modifying the LaTeX file 16. In addition, the user 106 may easily view the corresponding changes in the modified PDF document 26.

In some implementations, the action 18 is merging content from multiple PDF documents 12 using the LaTeX form of the PDF documents 12. The device 102 may receive a plurality of LaTeX files 16 for a plurality of PDF documents 12. The device 102 may create a new LaTeX file 28 by receiving a selection of at least one portion from each LaTeX file of the plurality of LaTeX files 16 to add to the new LaTeX file 28. The device 102 may output a new PDF document 30 that is a combination of the plurality of PDF documents 12 using the new LaTeX file 28.

In some implementations, the action 18 is comparing PDF documents 12 based on a LaTeX representation of the PDF documents 12. The device 102 may receive a plurality of LaTeX files 16 for a plurality of PDF documents 12. The device 102 may perform a comparison of the plurality of LaTeX files 16 to determine whether portions of the plurality of LaTeX files 16 are similar to each other or portions of the plurality of LaTeX files 16 are the same as each other. For example, the device 102 may execute a comparison function on the plurality of LaTeX files 16. The device 102 may output the response 20 with any portions of the plurality LaTeX files 16 identified as similar to each other or the same as each other in response to the comparison. The user 106 may use the response 20 to identify plagiarism and make plagiarism detection easier.

In some implementations, the action 18 is a customization of the PDF document. The device 102 receives a customization of the PDF document 12. In some implementations, the customization includes a different format of the PDF document 12. In some implementations, the customization includes modifying the document style (e.g., single column, double column, etc.) of the PDF document 12. The device 102 generates a modified LaTeX file 22 with the customization and outputs a modified PDF document 26 with the customization using the modified LaTeX file 22.

At 408, the method 400 includes running downstream document understanding tasks on the generated PDF document or the LaTeX code of the obtained LaTeX file. The device 102 may run downstream document understanding tasks on the generated PDF document (e.g., the modified PDF document 26, the new PDF document 30). The device 102 may also run downstream document understanding tasks on the obtained LaTeX file (e.g., the modified LaTeX file 22, the new LaTeX file 28).

As such, the method 400 may be used by the user 106 to easily perform a variety of actions 18 on the PDF documents 12 using the LaTeX files 16.

Figure 5:
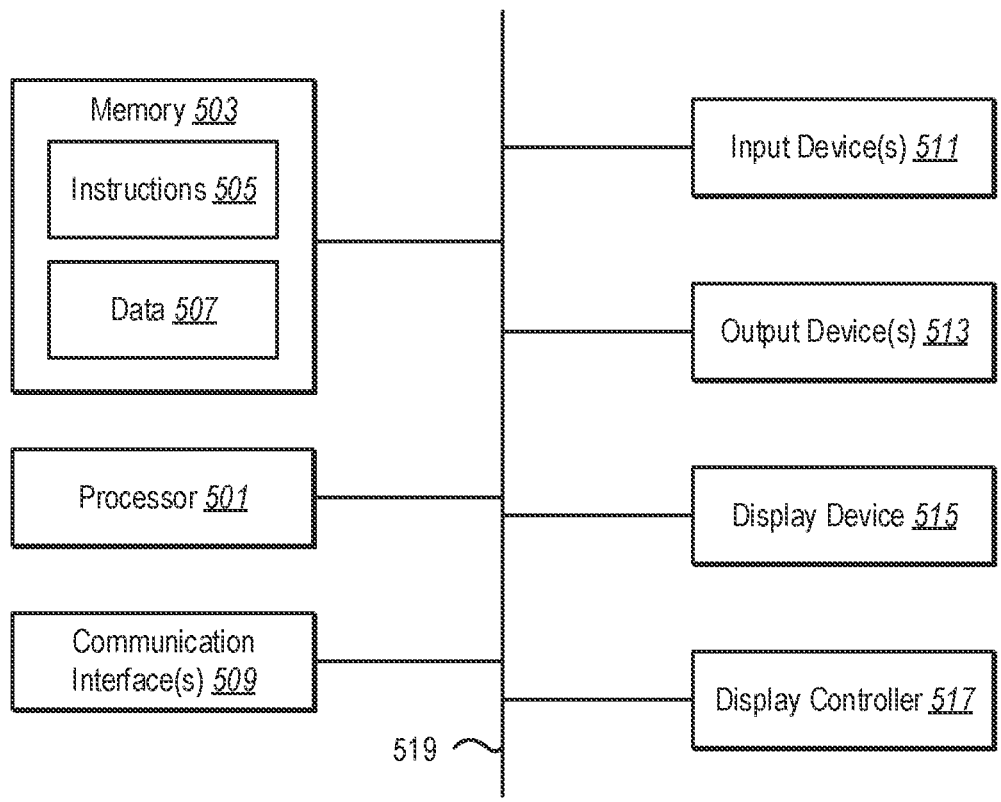
FIG. 5 illustrates components that may be included within a computer system.

FIG. 5 illustrates components that may be included within a computer system 500. One or more computer systems 500 may be used to implement the various methods, devices, components, and/or systems described herein.

The computer system 500 includes a processor 501. The processor 501 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 501 may be referred to as a central processing unit (CPU). Although just a single processor 501 is shown in the computer system 500 of FIG. 5, in an alternative configuration, a combination of processors (e.g., an ARM and DSP) could be used.

The computer system 500 also includes memory 503 in electronic communication with the processor 501. The memory 503 may be any electronic component capable of storing electronic information. For example, the memory 503 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 505 and data 507 may be stored in the memory 503. The instructions 505 may be executable by the processor 501 to implement some or all of the functionality disclosed herein. Executing the instructions 505 may involve the use of the data 507 that is stored in the memory 503. Any of the various examples of models and components described herein may be implemented, partially or wholly, as instructions 505 stored in memory 503 and executed by the processor 501. Any of the various examples of data described herein may be among the data 507 that is stored in memory 503 and used during execution of the instructions 505 by the processor 501.

A computer system 500 may also include one or more communication interfaces 509 for communicating with other electronic devices. The communication interface(s) 509 may be based on wired communication technology, wireless communication technology, or both. Some examples of communication interfaces 509 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 500 may also include one or more input devices 511 and one or more output devices 513. Some examples of input devices 511 include a keyboard, mouse, microphone, remote control device, button, joystick, trackball, touchpad, and lightpen. Some examples of output devices 513 include a speaker and a printer. One specific type of output device that is typically included in a computer system 500 is a display device 515. Display devices 515 used with embodiments disclosed herein may utilize any suitable image projection technology, such as liquid crystal display (LCD), light-emitting diode (LED), gas plasma, electroluminescence, or the like. A display controller 517 may also be provided, for converting data 507 stored in the memory 503 into text, graphics, and/or moving images (as appropriate) shown on the display device 515.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a transformer model, a classification model, a regression model, a language model, an object detection model) that can be tuned (e.g., trained) based on training input to approximate unknown functions. For example, a machine learning model may refer to a neural network (e.g., a transformer neural network, a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as models, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, embodiments of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. Unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
  receiving a Portable Document Format (PDF) document;
  using a plurality of machine learning models to analyze the PDF document and identify different portions of the PDF document and extract a plurality of PDF portions of the PDF document;
  creating a LaTeX file for the PDF document by formatting the plurality of PDF portions in the LaTeX file in an order corresponding to a presentation order of the PDF portions in the PDF document, wherein the LaTeX file includes code for the PDF document and the code distinguishes between the plurality of portions by identifying a start of each PDF portion and an end of each PDF portion;
  providing an output with the LaTeX file for the PDF document presented next to the PDF document; and
  changing a portion of the code presented for the LaTeX file to correspond to the portion of the PDF document presented in response to different portions of the PDF document being displayed.

2. The method of claim 1, wherein the plurality of PDF portions include one or more of text, a title, paragraphs, sections, subsections, flow charts, images, tables, images with captions, tables with captions, diagrams, math equations, symbols, authors, references, or any other metainformation from the PDF document.

3. The method of claim 1, wherein different machine learning models are used to identify separate PDF portions of the plurality of PDF portions.

4. The method of claim 3, wherein each machine learning model is specially trained for identifying and extracting a specific PDF portion of the plurality of PDF portions.

5. The method of claim 3, wherein a combination of different machine learning models are used to identify the separate PDF portions of the plurality of PDF portions.

6. The method of claim 1, wherein the LaTeX file distinguishes between each PDF portion of the plurality of PDF portions.

7. The method of claim 1, wherein the LaTeX file is generated for the PDF document on-the-fly in real time without requiring pre-computation of the LaTeX file.

8. The method of claim 1, further comprising:
  receiving a plurality of PDF documents;
  creating a plurality of LaTeX files for the plurality of PDF documents; and
  providing the output with the plurality of LaTeX files.

9. A method, comprising:
  receiving a LaTeX file from a Portable Document Format (PDF) document, wherein the LaTeX file includes code for the PDF document and the code distinguishes between separate portions of the PDF document by identifying a start of each PDF portion of the PDF document and an end of each PDF portion of the PDF document and the separate portions of the PDF document are arranged in an order in the LaTeX file corresponding to a presentation order of the separate portions in the PDF document;
  performing an action on the LaTeX file;
  generating a desired PDF document using an obtained LaTeX file in response to the action;
  providing an output with the obtained LaTeX file presented next to the desired PDF document; and
  changing a portion of the code presented for the obtained LaTeX file to correspond to the portion of the desired PDF document presented in response to different portions of the desired PDF document being displayed.

10. The method of claim 9, wherein the desired PDF document is generated on-the-fly in response to receiving the obtained LaTeX file.

11. The method of claim 9, wherein the action is modifying or editing existing content of the PDF document.

12. The method of claim 11, further comprising:
  receiving one or more modifications to the LaTeX file that provides at least one change to the PDF document;
  generating a modified LaTeX file with the at least one change; and
  generating the desired PDF document with the at least one change using the modified LaTeX file.

13. The method of claim 9, further comprising:
  receiving a selection of a first portion of a first LaTeX file for a first PDF and a selection of a second portion of a second LaTeX file for a second PDF document, wherein the action is merging content from a plurality of PDF documents by merging the first portion and the second portion into the obtained LaTeX file for the desired PDF document and generating the desired PDF document using the obtained LaTeX file.

14. The method of claim 13, further comprising:
  receiving a plurality of LaTeX files for the plurality of PDF documents;
  creating a new LaTeX file by selecting a portion from each LaTeX file of the plurality of LaTeX files to add to the new LaTeX file; and generating the desired PDF document using the new LaTeX file.

15. The method of claim 14, wherein the desired PDF document is a combination of the plurality of PDF documents.

16. The method of claim 9, wherein the action is comparing a plurality of PDF documents based on a LaTeX representation of the plurality of PDF documents.

17. The method of claim 16, further comprising:
receiving a plurality of LaTeX files for the plurality of PDF documents;
performing a comparison of the plurality of LaTeX files to determine whether portions of the plurality of LaTeX files are similar to each other or portions of the plurality of LaTeX files are the same as each other; and
providing an output with any portions identified as similar to each other or the same as each other in response to the comparison.

18. The method of claim 9, wherein the action is a customization of the PDF document, and the method further comprises:
receiving the customization of the PDF document;
generating a modified LaTeX file with the customization; and
generating the desired PDF document with the customization using the modified LaTeX file.

19. The method of claim 9, further comprising:
running downstream document understanding tasks on the generated PDF document or LaTeX code of the obtained LaTeX file.

20. The method of claim 1, wherein the plurality of PDF portions are placed in the LaTeX file based on a requirement of each PDF portion.

* * * * *